US011993446B1

(12) United States Patent
Coleman et al.

(10) Patent No.: US 11,993,446 B1
(45) Date of Patent: May 28, 2024

(54) DISPENSER FOR PRESSURIZED CANISTER

(71) Applicants: Todd Michael Coleman, The Colony, TX (US); Sheila Dingledine, Eustace, TX (US); Stephen William O'Brien, Fort Worth, TX (US); Irene Williams, Lakewood, OH (US); Michael E Quest, Franklin, TN (US)

(72) Inventors: Todd Michael Coleman, The Colony, TX (US); Sheila Dingledine, Eustace, TX (US); Stephen William O'Brien, Fort Worth, TX (US); Irene Williams, Lakewood, OH (US); Michael E Quest, Franklin, TN (US)

(73) Assignee: AC AVALANCHE, LLC, Valley View, OH (US)

( * ) Notice: Subject to any disclaimer, the term of this patent is extended or adjusted under 35 U.S.C. 154(b) by 269 days.

(21) Appl. No.: 17/684,918

(22) Filed: Mar. 2, 2022

Related U.S. Application Data

(63) Continuation-in-part of application No. 17/022,996, filed on Sep. 16, 2020, and a continuation-in-part of application No. 16/945,843, filed on Aug. 1, 2020, and a continuation-in-part of application No. 29/733,001, filed on Apr. 29, 2020, now Pat. No. Des. 950,019.

(51) Int. Cl.

| | |
|---|---|
| ***B65D 83/20*** | (2006.01) |
| ***B05B 12/00*** | (2018.01) |
| ***B65D 83/22*** | (2006.01) |
| ***B65D 83/48*** | (2006.01) |

(52) U.S. Cl.
CPC .......... *B65D 83/206* (2013.01); *B05B 12/008* (2013.01); *B65D 83/226* (2013.01); *B65D 83/48* (2013.01)

(58) Field of Classification Search
CPC .... B65D 83/206; B65D 83/226; B65D 83/48; B05B 12/008
USPC .......................................................... 222/635
See application file for complete search history.

(56) References Cited

U.S. PATENT DOCUMENTS 3,976,110 A * 8/1976 White ................ B60H 1/00585 141/346
4,593,607 A * 6/1986 Bennett ............... B05B 11/1011 92/130 B
4,895,190 A * 1/1990 Gillen .................. B65D 83/303 141/346

(Continued)

FOREIGN PATENT DOCUMENTS

WO WO-2011017425 A2 * 2/2011 ............. F16K 1/308

*Primary Examiner* — Paul R Durand
*Assistant Examiner* — Michael J. Melaragno

(57) ABSTRACT

A dispenser system for a pressurized canister including an actuator including components such as an external housing, a valve having a top stem connector for attachment to an output hose, support pins, and a one way ball check valve having a stem fitting with an extended valve stem for engaging the pressurized canister, a pivoting actuator control or trigger, having a trigger return spring, to bias the trigger out of engagement with the valve, unless a stop pin is removed and the trigger is pivoted into operating engagement under compression of the trigger and trigger return spring by a user. The sensor may communicate with a mobile device to indicate when to stop dispensing contents from the canister.

19 Claims, 11 Drawing Sheets

(56) References Cited

U.S. PATENT DOCUMENTS

| | | | | |
|---|---|---|---|---|
| 5,248,068 | A * | 9/1993 | Goergen | B05C 17/00553 222/326 |
| 6,296,228 | B1 * | 10/2001 | Knowles | F25B 41/40 251/149.6 |
| 6,334,320 | B1 * | 1/2002 | Brown | F25B 45/00 62/149 |
| 6,360,554 | B1 * | 3/2002 | Trachtenberg | C09K 5/045 62/149 |
| 6,385,986 | B1 * | 5/2002 | Ferris | B60H 1/00585 62/77 |
| 6,446,453 | B1 * | 9/2002 | Trachtenberg | B60H 1/00585 62/77 |
| 7,260,943 | B2 * | 8/2007 | Carrubba | F25B 45/00 62/146 |
| 8,875,524 | B1 * | 11/2014 | Parnell | F25B 45/00 62/77 |
| 9,243,829 | B1 * | 1/2016 | Parnell | F25D 27/00 |
| 9,915,357 | B1 * | 3/2018 | Ehlert | F25B 45/00 |
| 10,632,816 | B2 * | 4/2020 | Cai | F16L 15/003 |
| 10,724,775 | B1 * | 7/2020 | Wang | F17C 13/04 |
| 11,142,391 | B1 * | 10/2021 | O'Brien | B65D 83/206 |
| 11,199,348 | B1 * | 12/2021 | Wang | B25B 27/24 |
| 2001/0030596 | A1 * | 10/2001 | Barbier | G01L 19/0609 338/42 |
| 2005/0061014 | A1 * | 3/2005 | Cannan | B60H 1/00585 62/77 |
| 2012/0192576 | A1 * | 8/2012 | Carrubba | F25B 45/00 62/149 |
| 2012/0324920 | A1 * | 12/2012 | Carrubba | B60H 1/00585 62/77 |
| 2015/0040588 | A1 * | 2/2015 | Carrubba | F25B 45/00 62/77 |
| 2015/0184911 | A1 * | 7/2015 | Pistone | F25B 45/00 62/292 |
| 2016/0003509 | A1 * | 1/2016 | Pistone | G01L 19/0007 374/143 |
| 2016/0187039 | A1 * | 6/2016 | Higami | F25B 45/00 62/292 |
| 2016/0290694 | A1 * | 10/2016 | Pearl | B60H 1/00585 |
| 2019/0032977 | A1 * | 1/2019 | Carrubba | F16L 29/007 |
| 2019/0368795 | A1 * | 12/2019 | Pistone | F25B 45/00 |
| 2020/0271363 | A1 * | 8/2020 | Brewer, II | F25B 45/00 |
| 2022/0260291 | A1 * | 8/2022 | Benack | F25B 45/00 |

* cited by examiner

DISPENSER FOR PRESSURIZED CANISTER

CROSS REFERENCE TO RELATED APPLICATIONS

This application claims priority from U.S. patent application Ser. No. 29/733,001, filed Apr. 29, 2020, U.S. Ser. No. 16/945,843, filed Aug. 1, 2020, and Ser. No. 17/022,996, filed Sep. 16, 2020, the latter two of which claim priority from patent application Ser. No. 15/332,716 filed Oct. 24, 2016, which claims the benefit of provisional patent application Ser. No. 62/245,451 filed Oct. 23, 2015, the entireties of which are incorporated herein by reference.

FIELD OF THE DISCLOSURE

This application relates generally to a dispenser system using actuators and controls for dispensing gas or fluid from pressurized canisters.

BACKGROUND

Dispensers with actuators are used to control the outflow of gas or fluid products from pressurized containers—such as aerosol cans. The actuator is designed to facilitate the gas or fluid flow from the pressurized container to another location. The actuator may be designed to release the pressurized gas or fluid from an attached container when the actuator is depressed. When the actuator is released, the actuator stops the release of pressurized gas from the canister. Unfortunately, following manufacture and packaging of the dispenser together with the pressurized canister, but prior to purchase, there is an increased risk of release of the pressurized gas or fluid due to unintentional depression of the actuator. Such unintentional depressing of the actuator may occur during shipping, shelving of the product in the retail setting, or a potential purchaser may unintentionally mishandle the product while reviewing the product prior to making a purchase.

SUMMARY

The present application provides a dispenser with an improved actuator for a pressurized canister. The actuator may be part of a system and operate in connection with additional components.

The dispenser includes an external housing for containing actuator components forming a connection to the canister and operating to control the release of contents from the canister. The dispenser further includes a removable trigger lock or stop pin to prevent operation of the actuator components prior to removal of the stop pin from the dispenser. Internal actuator components may include a valve having a top stem connector for attachment to an output hose, support pins, and a one-way ball check valve having a stem fitting with an extended valve stem for engaging the pressurized canister, a pivoting actuator control or trigger having a trigger return spring for engagement at a pivot of the trigger and external housing to bias the trigger out of engagement with the valve, unless the stop pin is removed and the trigger is pivoted into operating engagement under compression of the trigger and trigger return spring by a user.

The pivoting actuator control connects within the external housing, and rotates around a pivot point at or near the connection with the external housing between locked and operating positions. When the trigger or actuator control rotates or pivots, it causes the trigger to engage with support pins extending transversely from the valve, and to slide the valve, ball check valve and extended valve stem down to engage, or up to disengage, a stem gasket within the pressurized canister. The trigger is designed to be blocked from operation by the removable trigger lock or stop pin, housed in locked position on and through an external surface of the dispenser external housing to prevent use of the dispenser until the stop pin is removed. The stop pin may be reengaged into locked position within the external housing following dispensing of gas or fluid from the canister.

The top stem connector of the valve may be located for attachment to an output hose that may pass within and through the external housing via a port extending from and configured through the external housing. The extended valve stem from the ball check valve stem fitting is configured to enter the output of the pressurized canister within the stem gasket.

The connection to the canister may fit over the canister's stem gasket, and connect using a threaded connection, snap-fit connection, friction fit connection or other connection. The canister connector may hold the extended valve stem to the canister. In some embodiments, the canister connector may include a seal to prevent leakage from the connection.

In some embodiments, the dispenser includes a sensor holder formed in the dispenser external housing. The sensor may be a mechanical component, electronic component or other accessory. The sensor is configured to be removable from the sensor holder in the dispenser.

In some embodiments, the sensor may connect to a measurement feature within the dispenser and provide a sensor output. The sensor output may be a display, such as a digital display to show pressure in the canister output.

The sensor or sensor holder may also be provided with an air freshening air permeable filter media for removing contaminants and/or particulates from within the vehicle cabin air, as well to provide a scented air freshening material dispersed within the vehicle cabin air.

A BRIEF DESCRIPTION OF THE DRAWINGS

Embodiments will now be described, by way of example only, with references to the accompanying drawings in which.

Figure 4:
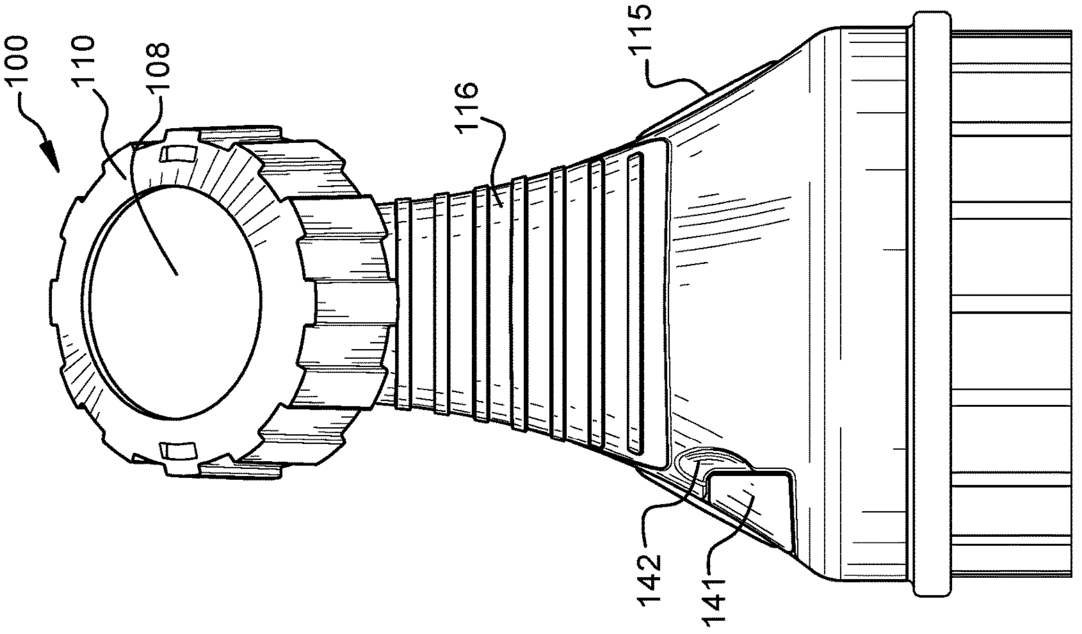
FIG. 4 is a schematic front end view of the dispenser embodiment of FIG. 2.
Figure 6:
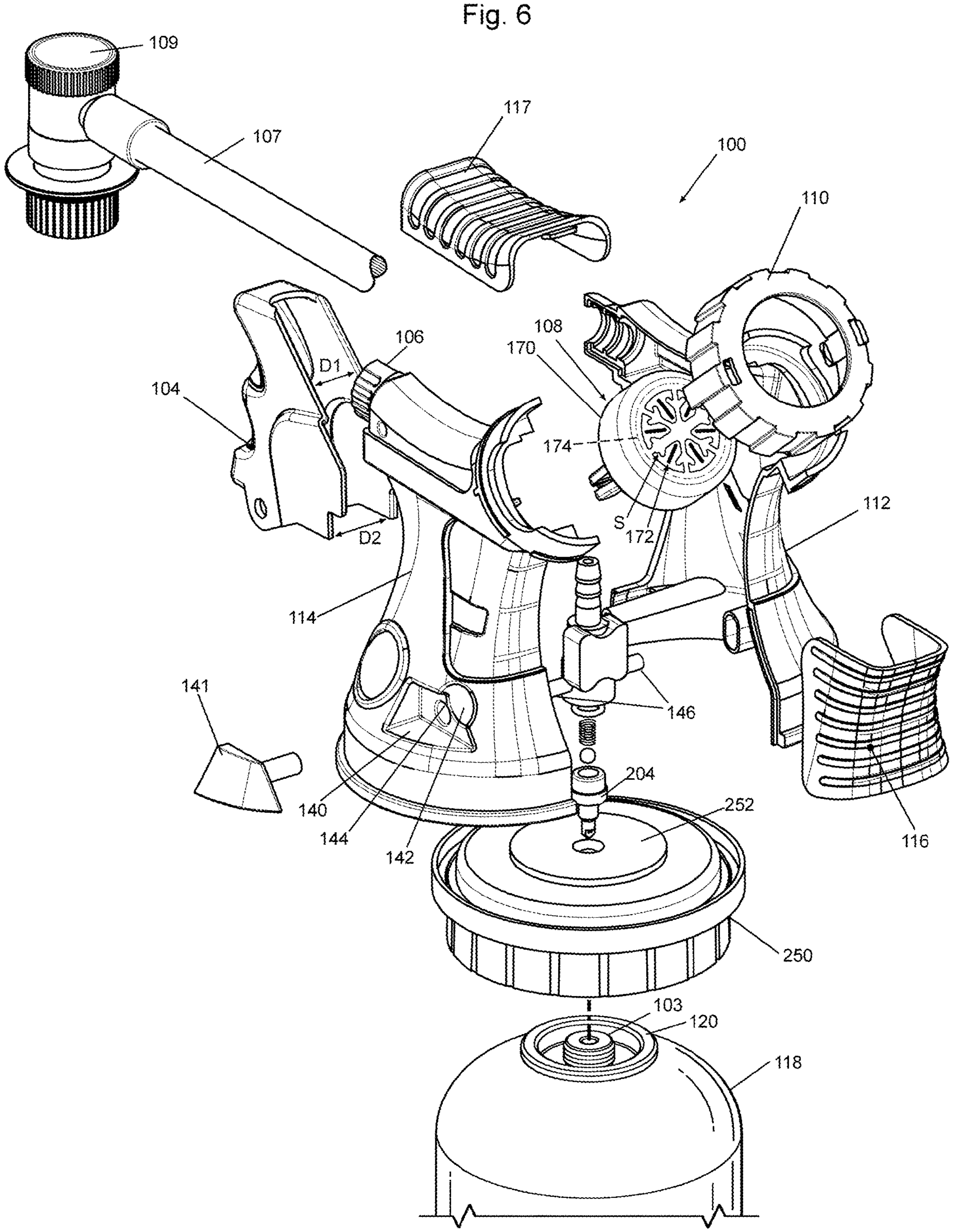
FIG. 6 is a partial, schematic exploded view of the dispenser of FIG. 1.
Figure 6B:
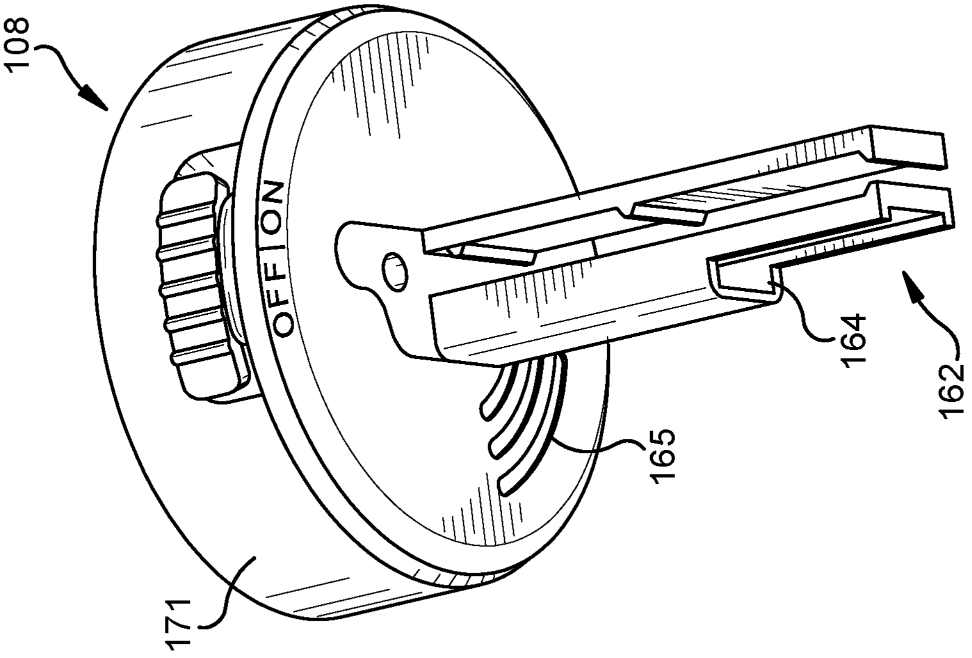
Figure 6A:
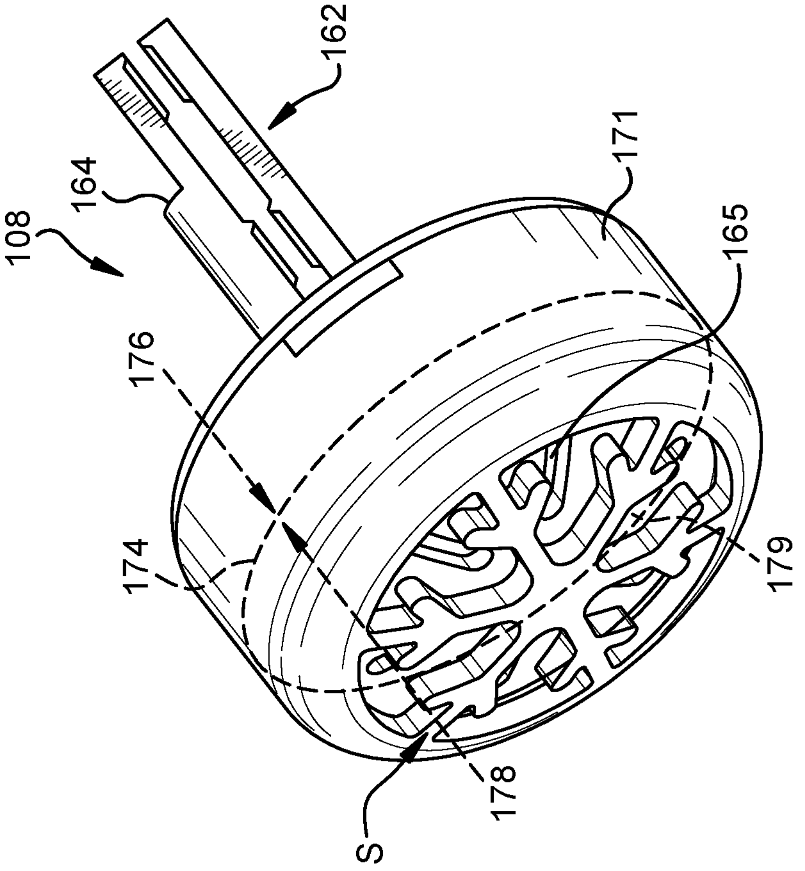
Figure 7B:
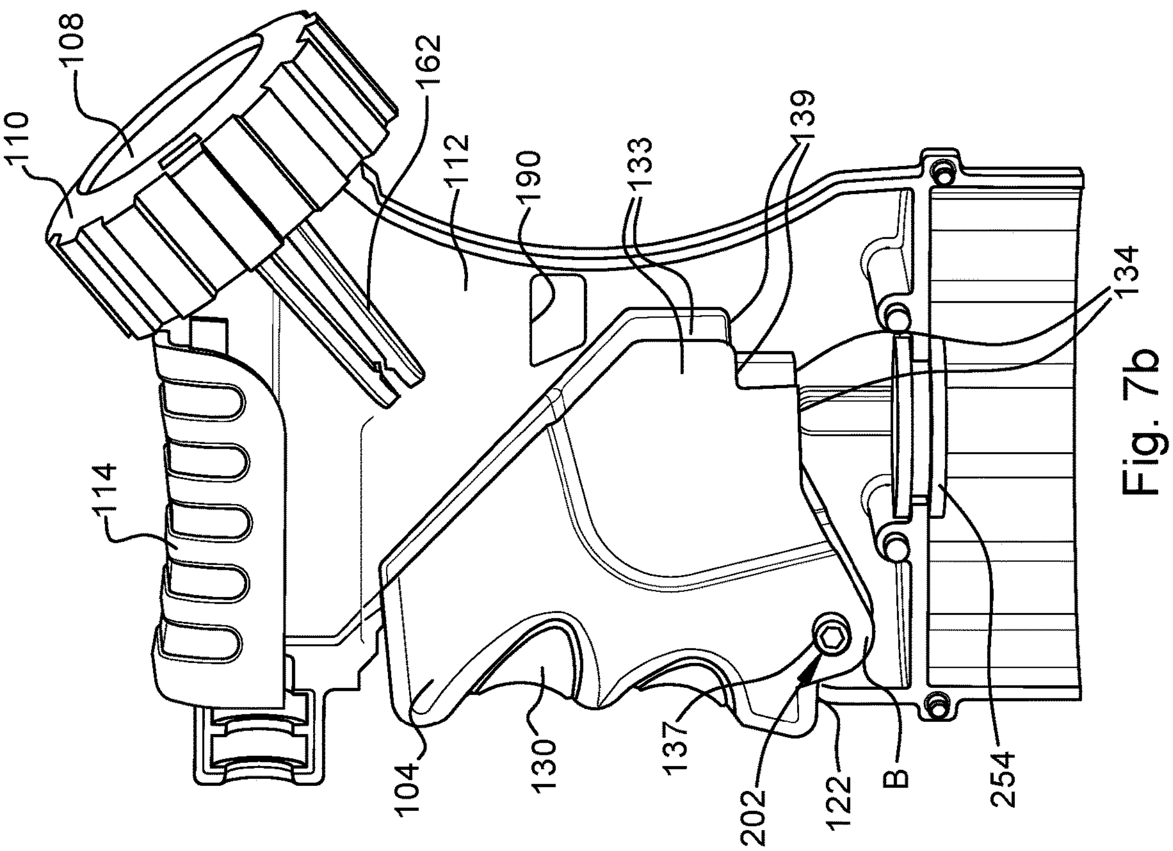
Figure 7A:
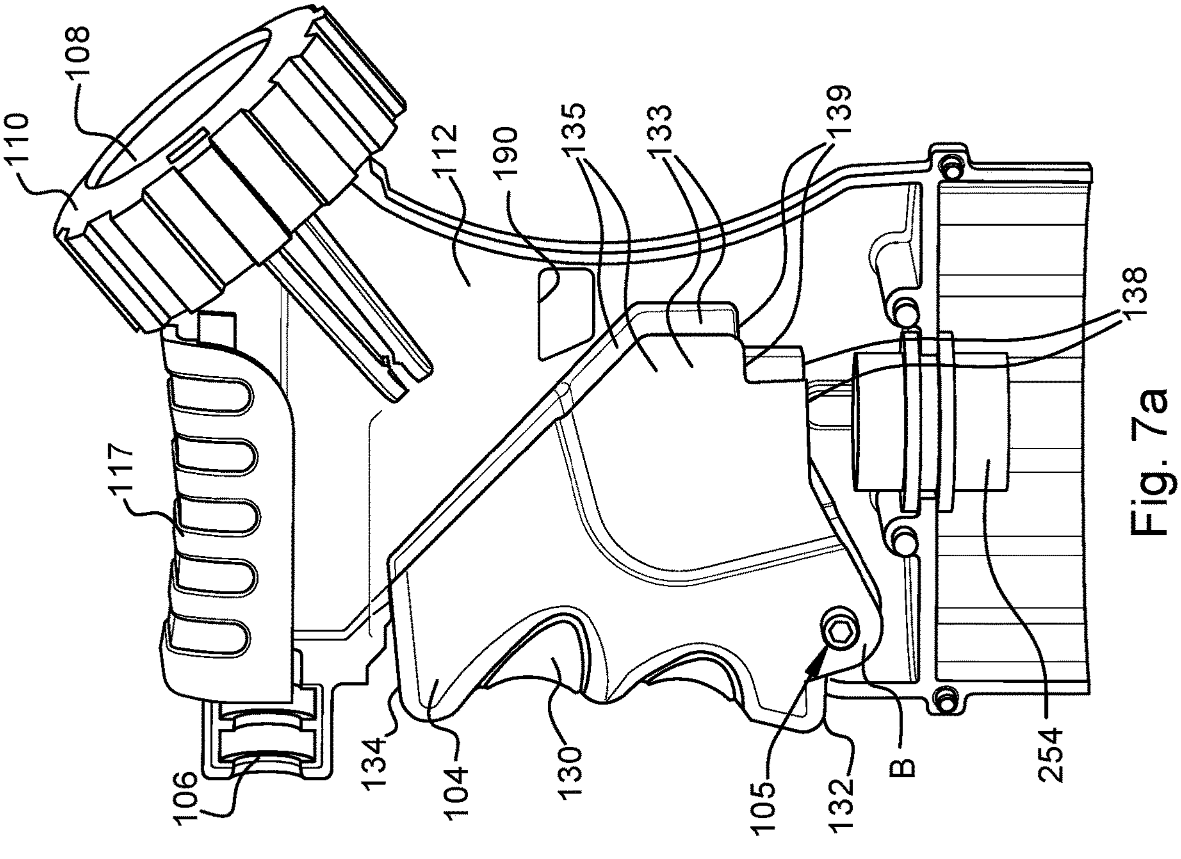
Figure 9:
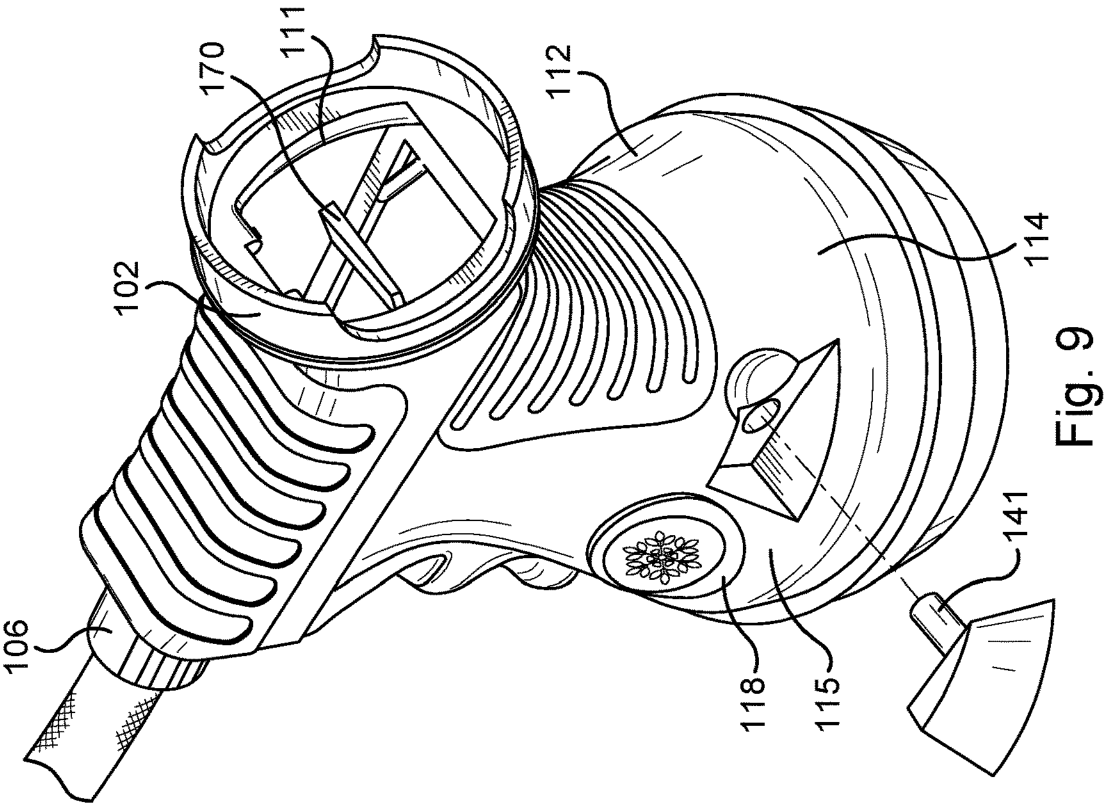
Figure 8:
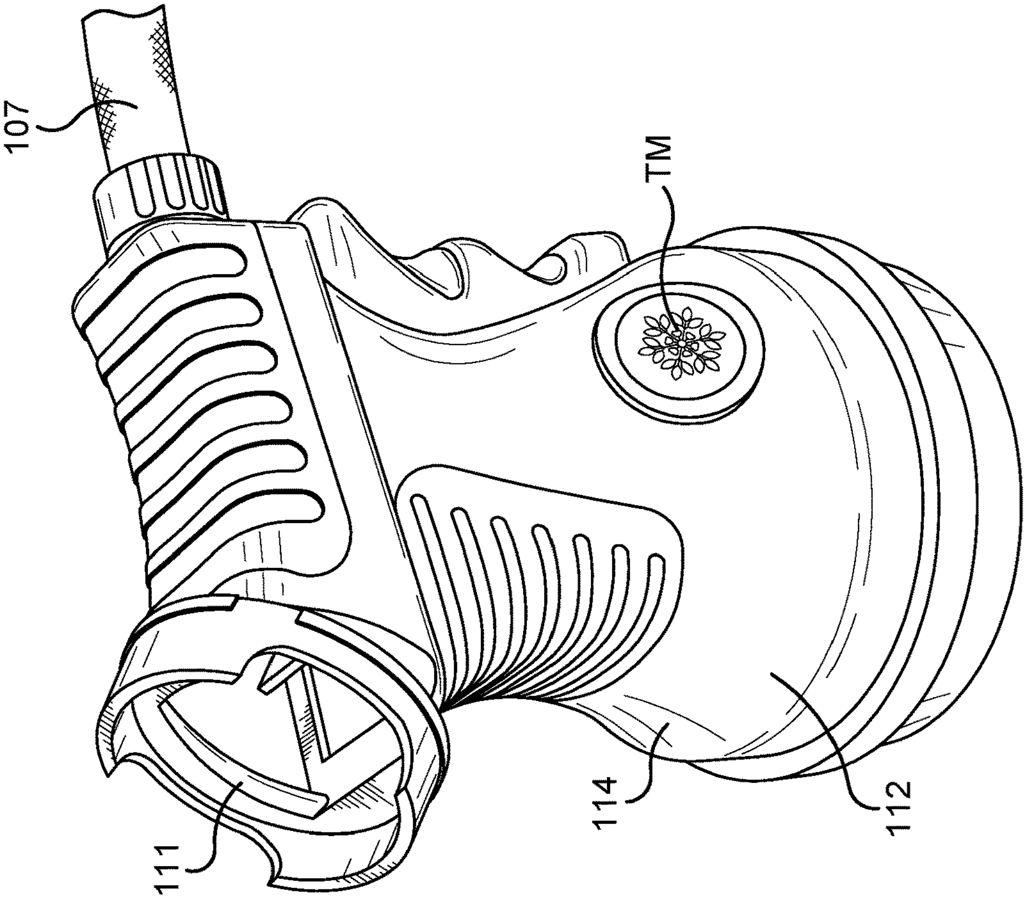
Figure 10B:
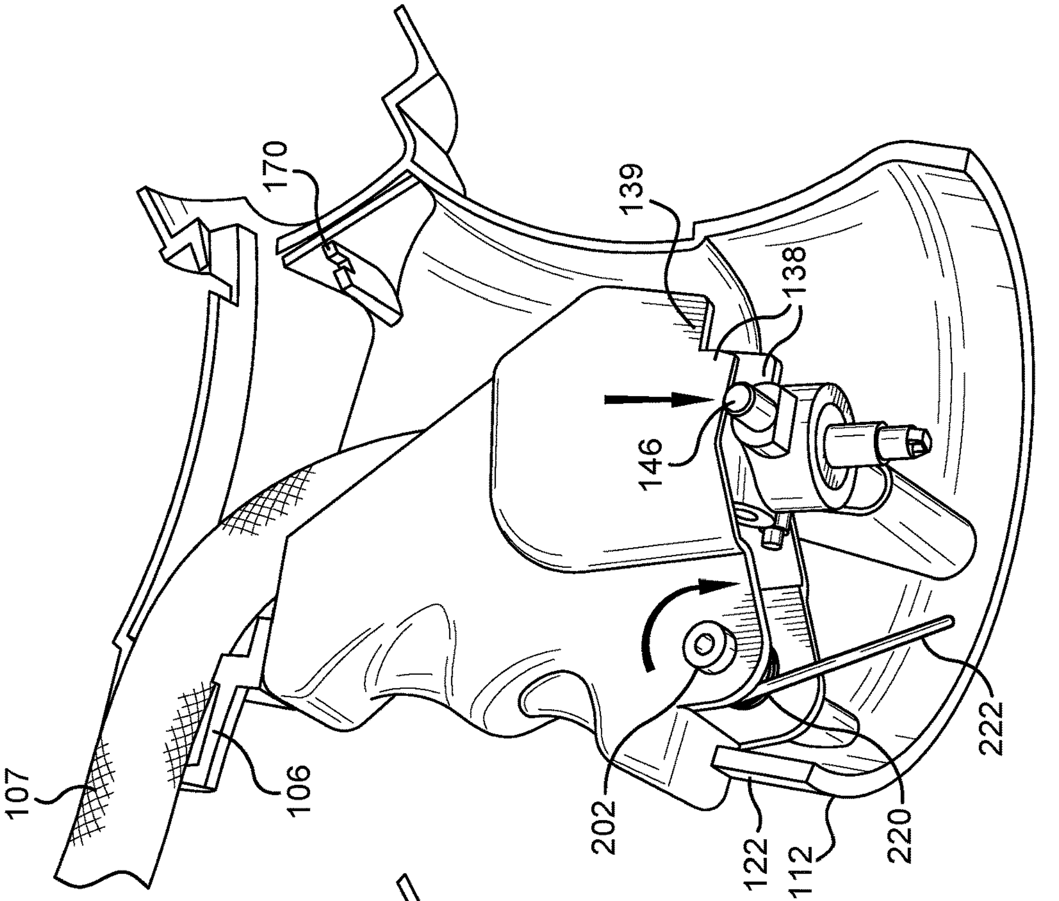
Figure 10A:
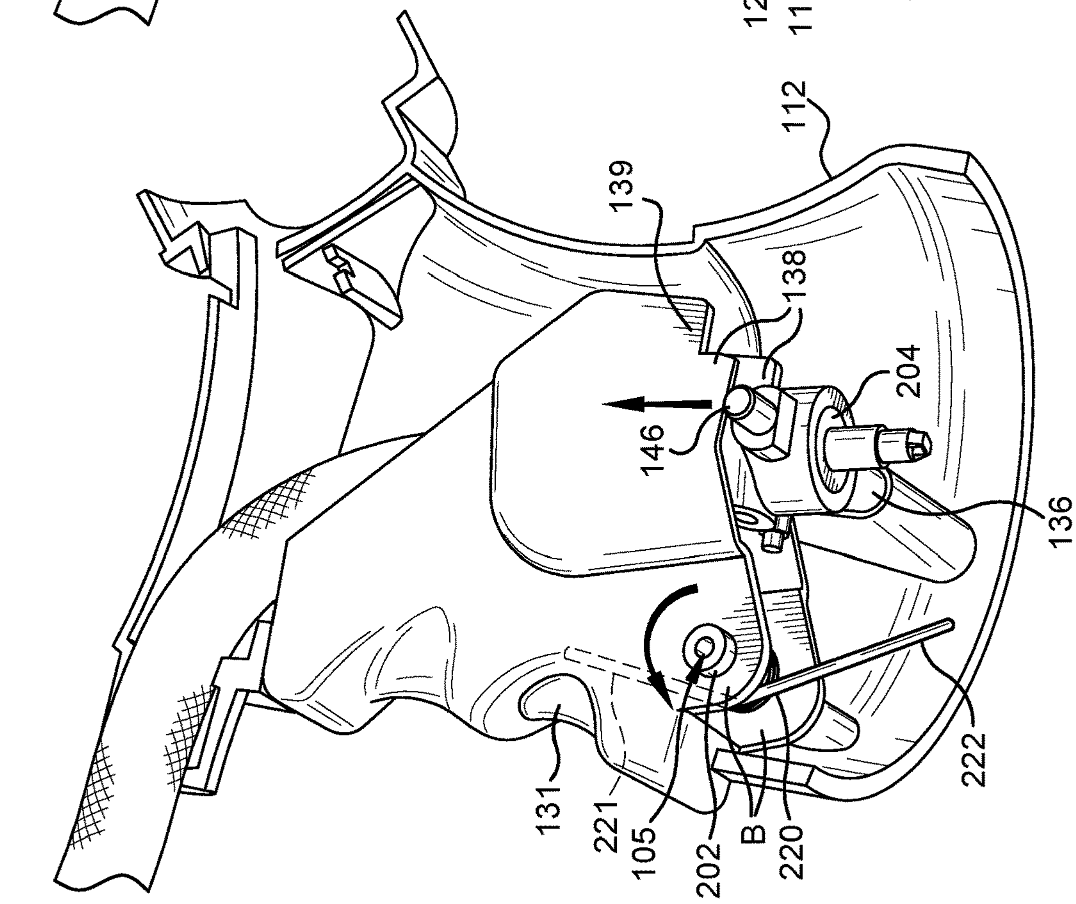
Figure 11B:
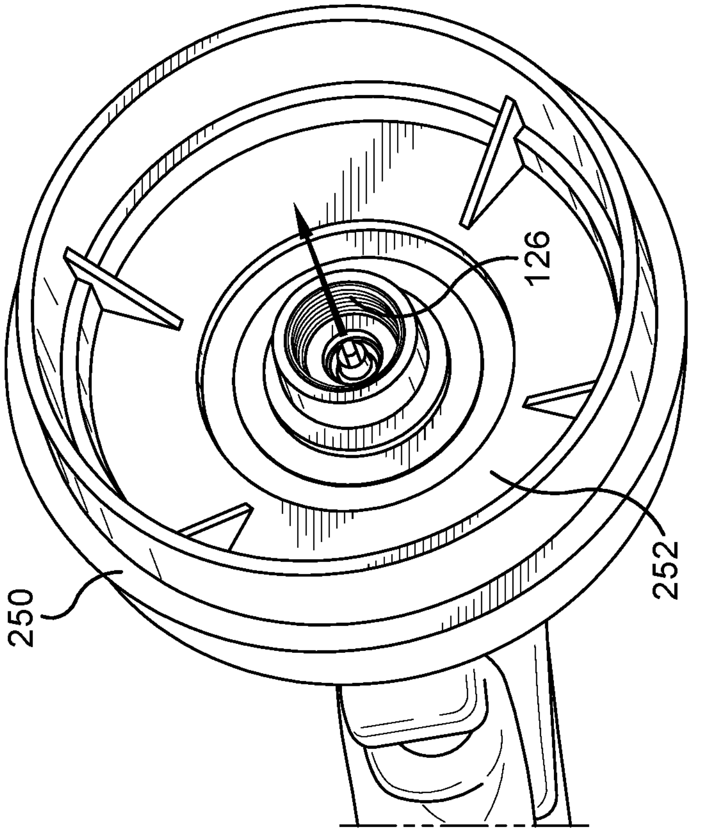
Figure 11A:
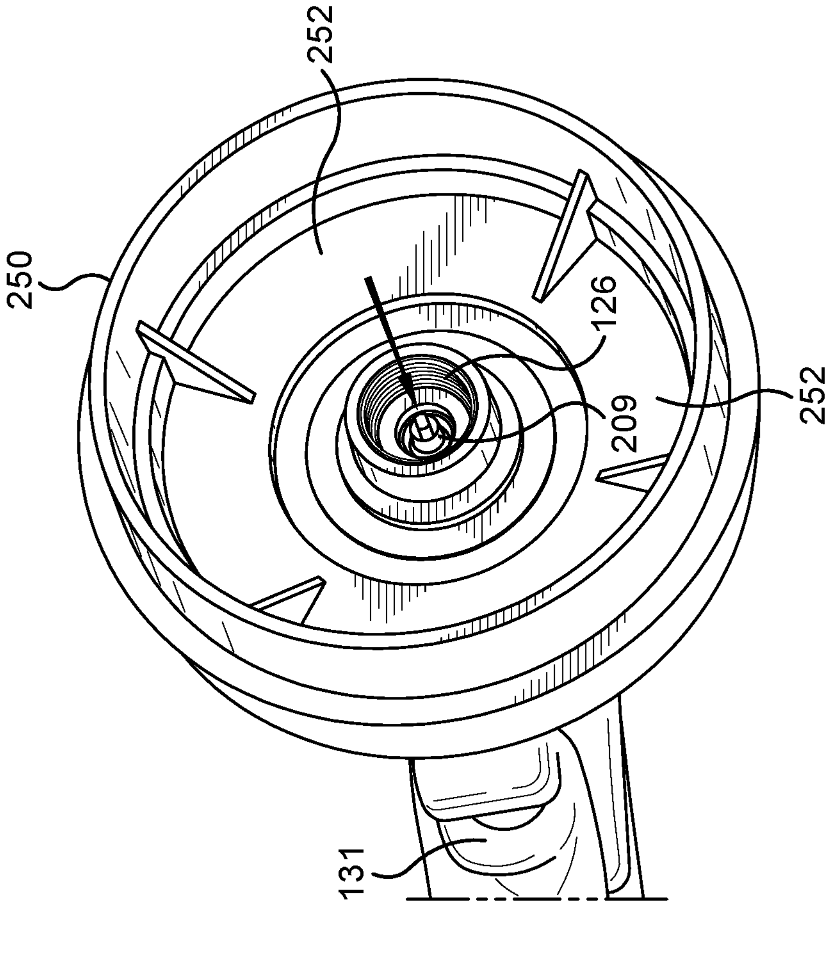

FIG. 6*a* is a schematic perspective front view of the sensor;

FIG. 6*b* is a schematic perspective rear view of the sensor;

FIG. 7*a* is a partial, schematic perspective cut-away side view of certain components of the dispenser, taken along the line 4-4 of FIG. 4, and with the actuator trigger in an operating position;

FIG. 7*b* is a partial, schematic perspective cut-away side view of the dispenser of FIG. 7*a*, but with the actuator trigger shown in a non-operating position;

FIG. 8 is a schematic, perspective top, right side view of the dispenser with the sensor holder and sensor removed;

FIG. 9 is a schematic, perspective top, left side view of the dispenser of FIG. 8 with the lock pin removed from the dispenser housing;

FIG. 10*a* is a partial, schematic perspective cut-away view of the dispenser taken along the line 10-10 of FIG. 9, and with the actuator controls biased to a non-operating position;

FIG. 10*b* is a partial, schematic perspective cut-away view of the dispenser of FIG. 10*a*, but with the actuator controls shown in operating position;

FIG. 11*a* is a schematic, perspective bottom view of the dispenser in a non-operating position as in FIG. 10*a;*

FIG. 11*b* is a schematic, perspective bottom view of the dispenser in an operating position as in FIG. 10*b;*

Figure 12:
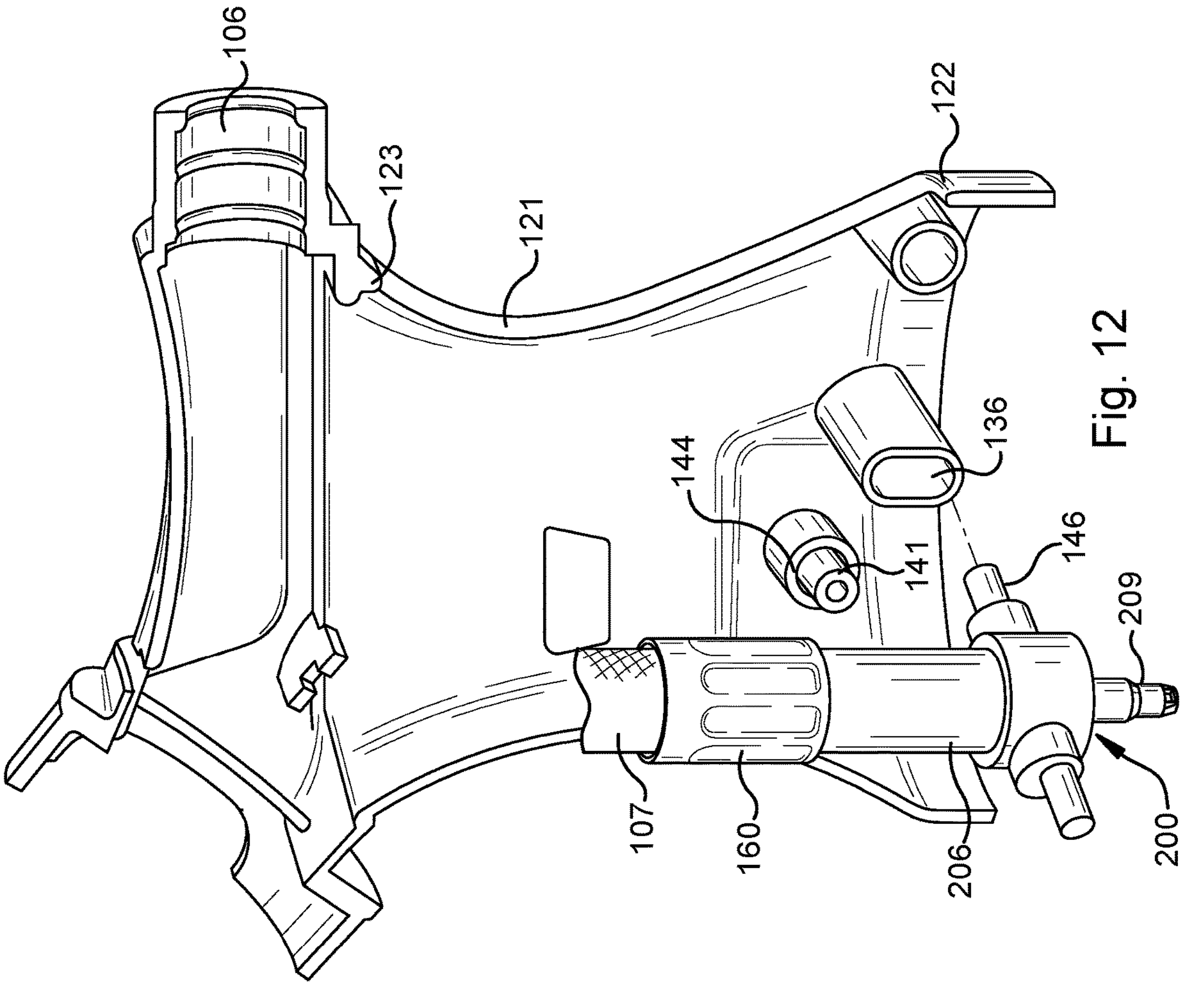
Figure 13:
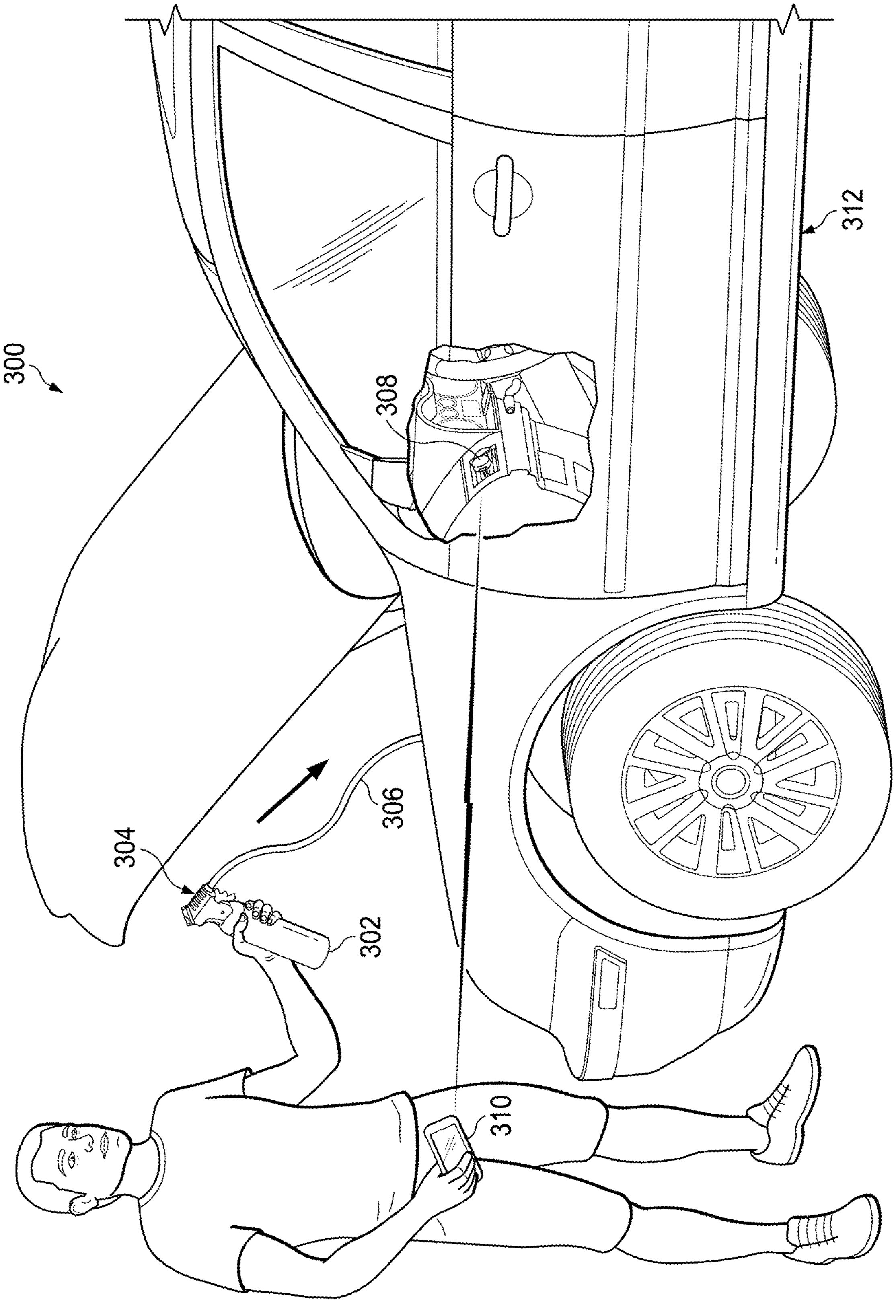

FIG. 12 is a partial, schematic cut-away view of the movable valve positioned for engagement with the guide channels in one half of the dispenser housing;

FIG. 13 is a schematic view of an automotive application using an embodiment of a dispenser and actuator on a canister.

DETAILED DESCRIPTION

While the subject matter of this application may be embodied in many different forms, described here in detail is a preferred embodiment with the understanding that the present disclosure is to be considered as an exemplification of the principles described and is not intended to limit the broad aspects described to the embodiments illustrated. It will be understood that the disclosure may be embodied in other specific forms without departing from the spirit or central characteristics thereof. For context, the orientation of the components may be referred to by directions (e.g., top, bottom, right, left, etc.) as shown in the figures. Those skilled in the art will recognize that during use these directions may be changed without changing the relationship between components. The present embodiment, therefore, is to be considered in all respects as illustrative and not restrictive, and not to be limited to the details given herein.

FIGS. 1 through 13 depict embodiments of a dispenser system having a dispenser for a pressurized canister. The dispenser 100 includes a dispenser external housing 102, a trigger 104, an output port 106, a sensor fitting 110 and sensor 108. The dispenser external housing 102 includes side walls 112 and 114, a removable back cover 116 and a removable top cover 117.

The side walls 112 and 114 extend from the back of the dispenser 100 to the front, where the dispenser output port 106 is located. The side walls 112 and 114 may attach to each other using a variety of connectors. For example, the side walls 112 and 114 may have corresponding snap-fit or friction fit components. In other embodiments, the dispenser 100 may include screws, bolts, pins, adhesives or other connectors to hold the side walls 112 and 114 together. In some embodiments, the side walls 112 and 114 may connect to other components as well. For example, the side walls 112, 114 may support a valve 200, and form a trigger pivot 105 having an axle 202 movably supporting the trigger 104 using a trigger return spring 220. An external surface 115 of the dispenser external housing also includes a surface housing 118 for display and placement of advertising or trademark indicia™ related to the dispenser.

In the embodiment of FIGS. 1 to 12, the side walls 112 and 114 form a trigger opening 121, the output port 106 and a sensor opening 111. The trigger 104 is located within and extends through the trigger opening 121, which is below the output port 106. A finger operating portion 130 of the trigger extends through the trigger opening 121. A bottom edge 132 of the trigger and a top edge 134 of the trigger, both extending through the trigger opening 121 to form the finger operating portion 130, do not extend below or above, respectively, the bottom edge 122 or top edge 123 of the trigger opening. The trigger opening 121 allows space for the trigger 104 to move, rotate or pivot, as shown by the directional arrows in FIGS. 10*a* and 10*b*, about a pivot point 105 for operation of the dispenser 100. Those skilled in the art will recognize that the size and shape of the trigger opening may vary to correspond with varying designs of trigger 104, noting that in the present trigger embodiment, the profile of the bottom and top edges of the trigger extend solely between or within the lower and upper limits of the trigger opening, as shown in FIGS. 10*a* and 10*b*.

The portion of the trigger 104 housed within the dispenser external housing 102 includes the pivot point 105 located below the bottom edge 122 of the trigger opening. The finger operating portion 130 of the trigger forms a web 131, interconnecting spaced legs 135 forming part of the trigger. Each leg 135 extends inwardly into the dispenser external housing 102 from the finger operating portion 130 through the trigger opening, and extends downwardly to form a boss B including an opening 137 for engaging an axle 202 at the pivot 105. The boss B formed in each leg 135 is spaced from and below the bottom edge 122 of the trigger opening 121. The trigger 104 is rotatably mounted at the pivot point 105 located within the boss B and on the axle 202 engaged with and supported between the side walls 112, 114 within axle mounts 203 extending inwardly from within the external housing 102. A trigger return spring 220 with two legs 221, 222 is also mounted, wrapped or coiled to surround the axle 202, for biasing the trigger 104 between a closed position, as shown in FIGS. 10*a* and 7*a*. And, upon removal of the stop pin 141 from a depression 140 shaped to correspond to the shape of the stop pin and a finger access depression 142, and from a stop pin opening 144 through the external surface 115 of the dispenser external housing 102, the user may bias or compress the trigger return spring 220 for moving the trigger 104 to a position for operating the dispenser. As shown in FIG. 6, the boss B of each leg of the trigger 104 is spaced a first distance D1 apart, which first distance is slightly smaller than the width of the trigger opening 121, so that the finger operating portion of the trigger passes through and operates without substantial, if any, resistance from any engagement with side walls 112, 114 adjacent the sides of the trigger opening.

Each leg 135 additionally includes an activation portion 133 having a valve shoulder 138 and a lock shoulder 139. In the illustrated embodiment of FIG. 6, the lock shoulder 139 is spaced a further distance from the pivot 105 than the valve shoulder 138. The lock shoulder 139 is also positioned above the valve shoulder 138 and pivot 105. The lock shoulder 139 of the trigger 104 is positioned for engagement with the stop pin 141 to prevent operation of the dispenser when the stop pin is engaged in locked position, as shown in FIGS. 9 and 12. The activation portions 133 of the legs 135 are spaced a second distance D2 apart, which second spaced distance D2 is larger than the first spaced distance D1, for surrounding a body portion 206 of the valve, and also for engagement of the support pins 146 extending from the valve with the valve shoulder 138 to move the valve 200 down upon compression of the trigger by a user for operating the dispenser system. The support pins 146 extend from opposite sides of the body portion 206 of the valve 200 and are supported and engaged for sliding movement within vertically elongate guide channels 136, shown in FIGS. 12 and 6, extending inwardly from the side walls 112, 114 within the external housing 102. In this embodiment, the body portion is provided surrounding internal valve 200 components. During operation, upon compression of the trigger 104 by a user, the support pins 146 slide within the guide channels 136. The guide channels 136 are configured as closed elongate ovoid shapes to prevent the support pins from sliding out of engagement with the external dispenser housing 102, and resist rotational movement of the actuator components within the external dispenser housing. In a non-operating position, the support pins are captured at the top of the guide channels. During operation, the support pins are moved to, and stopped at, the bottom of the guide channels, enabling movement and compression of the internal valve 200 components to open the valve and release the contents of the canister in the operating position.

The output port 106 is in the front section of the dispenser external housing 102. The trigger opening 121 and output port 106 are configured to allow a hose or output tube 107 to disperse the contents of the canister 118, the hose passing from a connection, shown as a crimped connector 160 engagement with the top stem connector 208, within the dispenser external housing 102 and out of the dispenser 100 via a coupler 109 shown in FIG. 1 as a quick disconnect coupler, engaged with the output hose, and for attachment to a vehicle air conditioning charging port for receiving flow of gas or fluid from the canister. The output port 106 supports the position of the hose 107 exiting the external housing, but does not prevent slight axial movements of the output hose.

The sensor opening 111 is in a back section of the dispenser housing 102. The sensor fitting 110 surrounds the sensor opening 111. The sensor 108 is fitted into the sensor opening 111 and held in place on the dispenser housing 102 by the sensor fitting 110. The sensor fitting 110 is designed to temporarily lock the sensor 108 in place until the sensor is removed for use. The cover 171 of the sensor 108 may include openings 172 therethrough, to provide air to access the internal components of the sensor as shown in FIG. 6. The openings 172 are formed as cutouts having a desired shape or object, for example, a corporate logo for marketing or other advertising, or a snowflake or other inanimate or animate object S.

An air permeable filter media 174 may also be used within the sensor 108, and may be any variety of filtering media for removing contaminants and/or particulates from air. Including for example, synthetic non-woven media, cellulose based filter media and/or foam filtering media. The filter media 174 may be a sheet material that is pleated, or a non-pleated filter mat of synthetic non-woven filter media, having various densities to provide the desired porosity for air flow through the filter media. Other filter media materials may also be known to those skilled in the art and may also be used.

As shown schematically in FIG. 6, the air permeable filter media 174 is secured to or adjacent the interior of the sensor 108 under the sensor cover 171. The filter media 174 may be secured by an adhesive, or seated and captured in position without adhesive. Alternatively, other mechanical attachment mechanisms may be used, such as a hook on an internal portion of the sensor, which is secured through an opening in the filter media, or through the use of conventional hook and loop fastener materials. The filter media 174 has an internal airflow face 176 generally facing the interior of the air vent, and a vehicle cabin air face 176 generally facing away from the air vent and into the vehicle cabin interior.

A scented air freshening material 179 may also be provided on, in or adjacent the filter media 176. The air freshening material may be any air freshening composition known to those skilled in the art. The air freshening material may be a wax, gel or liquid material that is layered, embedded or sprayed onto portions of the air filter material. Such air freshening material is diffused into the airflow stream of the air vent and thereby dispersed within the vehicle cabin interior. Filtering of the air through the air filter media 176 may also be provided to remove particles and contaminants such as chemical contaminants, and depending on the filter media provided, all types of large and small biological contaminants including allergy agents like pollen. In addition to the air freshening material, the filter media 176 may additionally be provided with antimicrobial and/or antibacterial agents such as metal silver fibers as an effective antibacterial agent. Other antibacterial agents known to those skilled in the art may also be utilized on or in the filter media as antibacterial agents.

Figure 1:
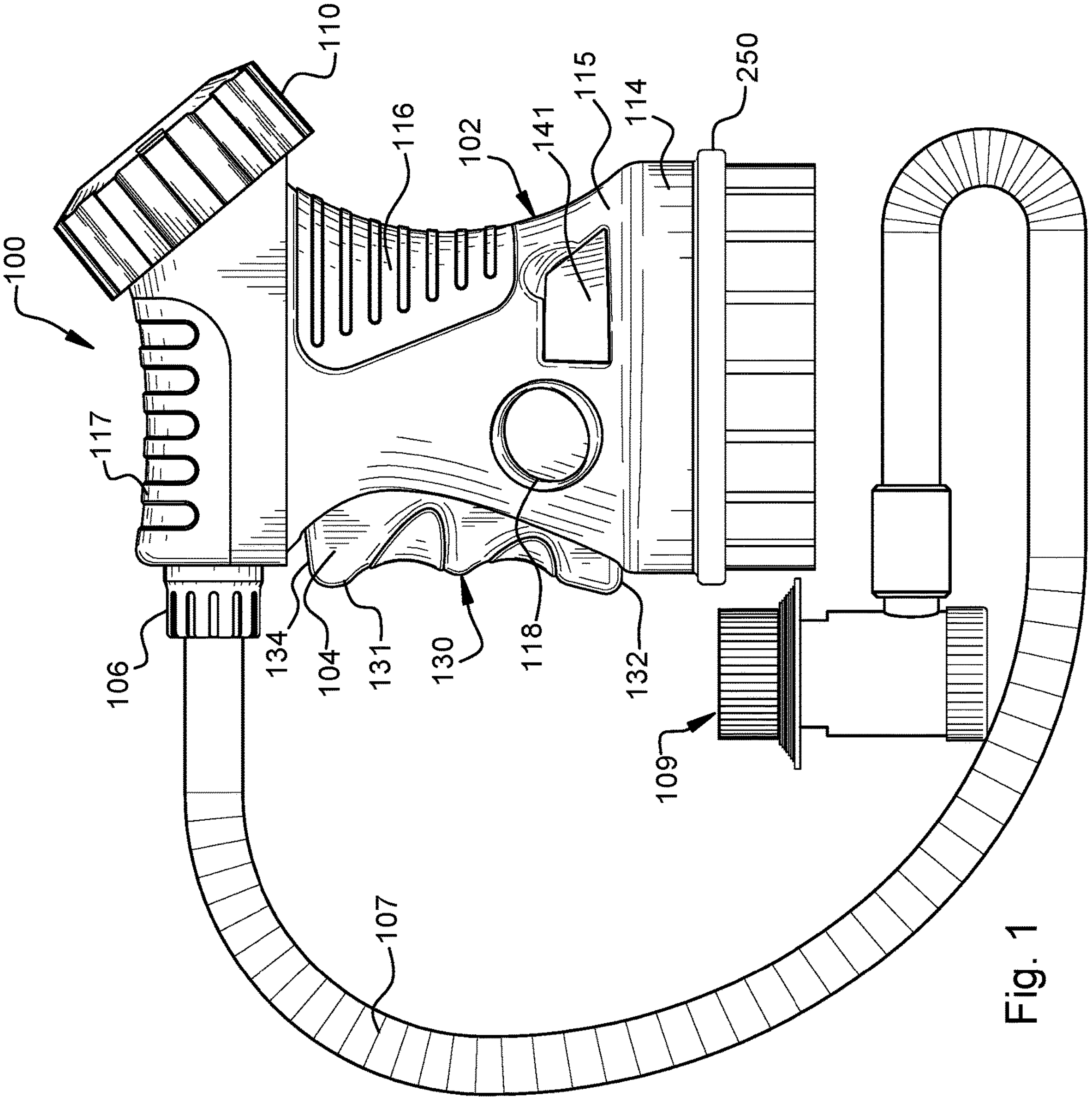
FIG. 1 is a schematic side view of an external embodiment of a dispenser system of this application.
Figure 2:
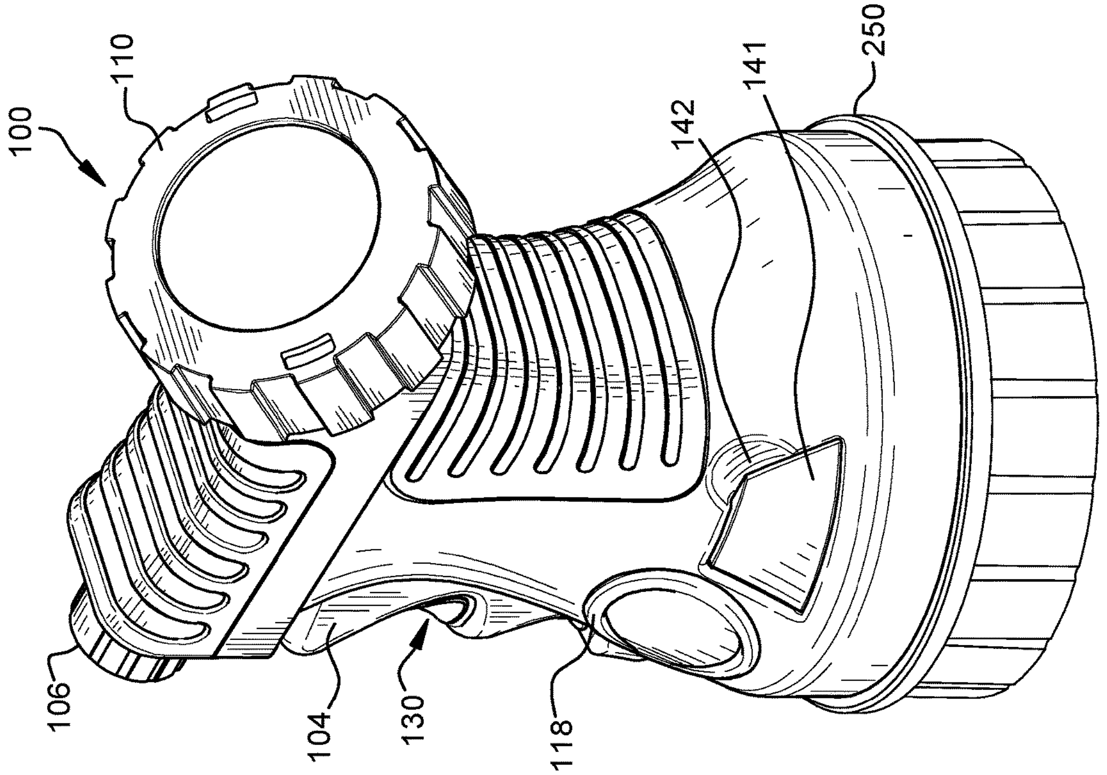
FIG. 2 is a schematic, side perspective view of an embodiment of the dispenser of FIG. 1.
Figure 3:
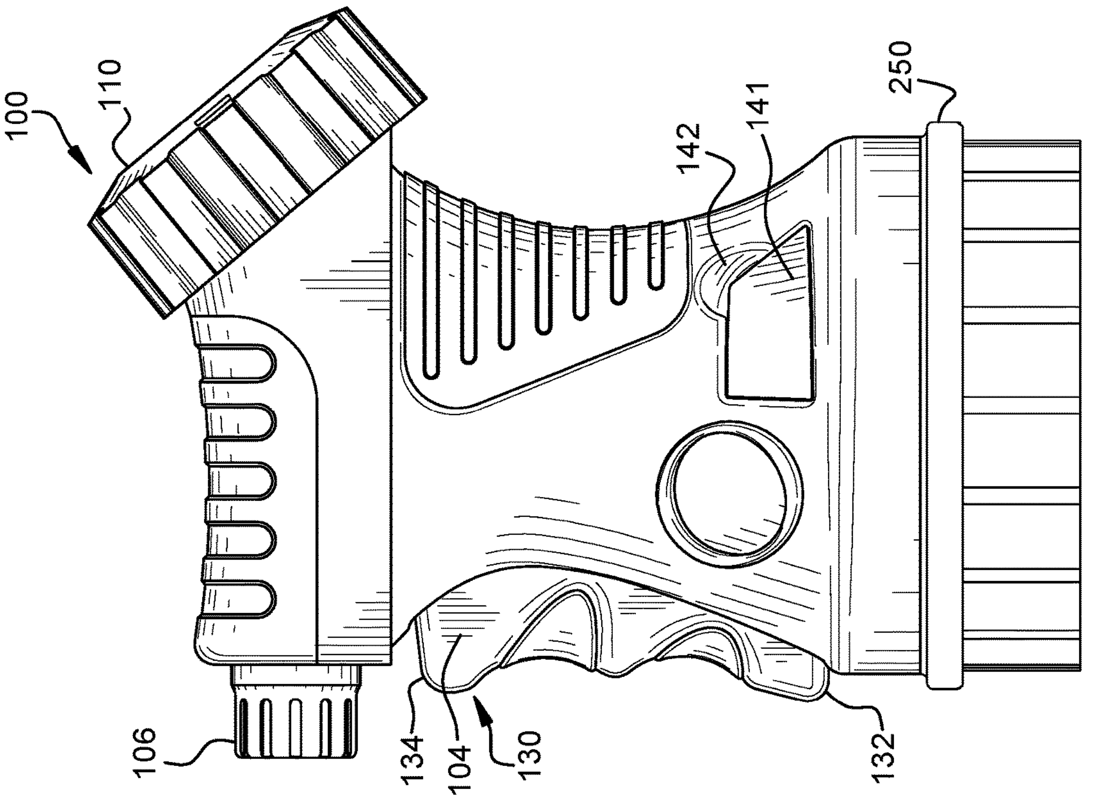
FIG. 3 is a schematic side view of the dispenser embodiment of FIG. 2.
Figure 5:
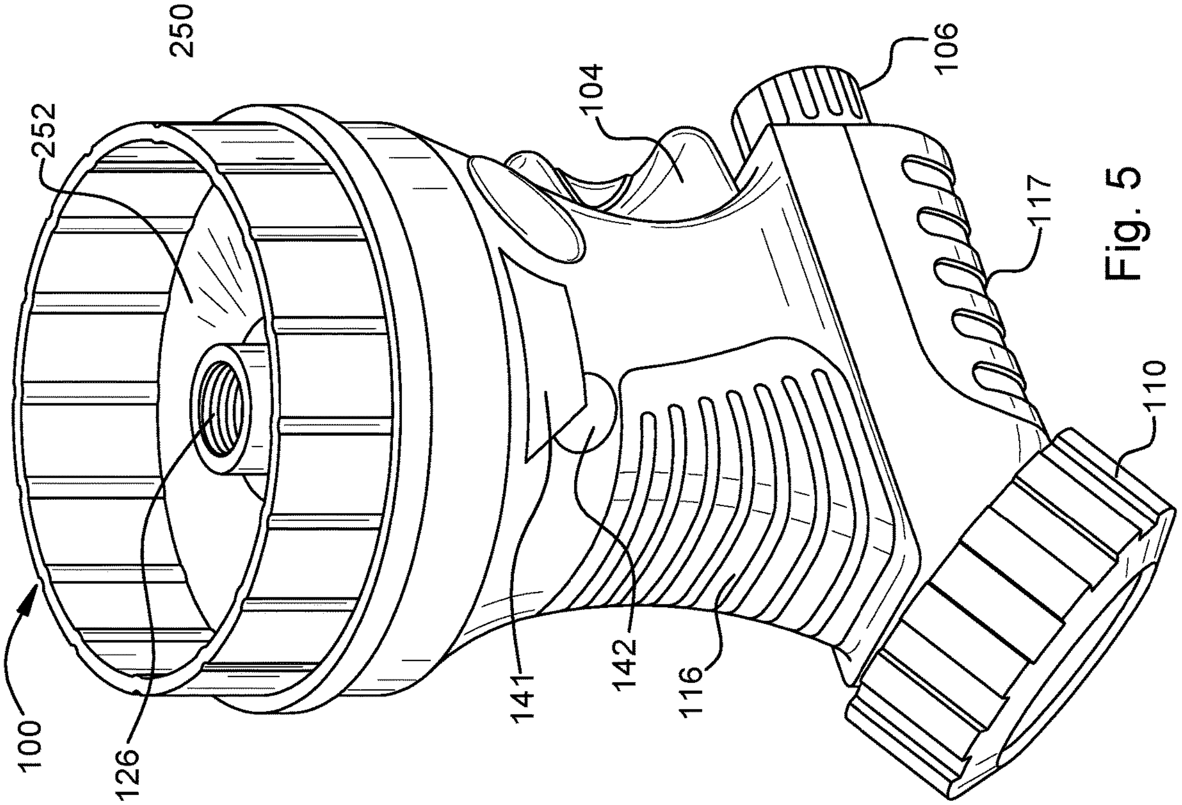
FIG. 5 is a schematic bottom side view of the dispenser embodiment of FIG. 1, as shown with a pressurized canister.

The removable back cover 116 may include one or more prongs to form snap-fit connections on or within openings 190 in the side walls 112, 114. The back wall 116 may prevent the inadvertent separation between the side walls 112 and 114. A bottom housing 250 for engagement over the mounting cup 120 of the canister, and including a bottom wall 252, is formed as part of the dispenser external housing 102. As shown in FIGS. 5, 11*a* and 11*b*, the bottom housing 250 is permanently secured to the side walls 112, 114 using an adhesive. However, an alternate threaded engagement between the bottom housing and the side walls may be included for providing a removable engagement. The bottom housing 250 may incorporate the threaded canister connecter 126 for attachment to the threaded stem gasket 103 of the canister 118.

The actuator components are supported in part within the dispenser external housing 102. As illustrated in FIGS. 1-7 and 12, the actuator includes an actuator control or trigger 104, a movable valve 200 having top stem connector 208, a body portion 206 with external support pins 146, a stem connector 204 with an extended valve stem 209 for engagement within the stem gasket 103 of the canister, and the canister connector 126 fitting into a mounting cup 120. The stem connector 204 engages the output of the canister 118 at the stem gasket. The stem connector 204 and extended valve stem 209 of the one-way ball check valve 200 illustrated in FIGS. 6, 11*a* and 11*b*, are configured to cause the release of the canister 118's contents through the valve, stem connector and extended valve stem 209 when the valve is moved downward. The valve 200 moves downward upon compression and pivoting of the trigger by a user, the resulting downward engagement of the trigger valve shoulder onto the support pins 146 of the valve, slides the valve support pins down within the guide channels 136, moves the valve downward and opens the one-way ball check valve to release the contents of the canister. When the trigger 104 is released, and the valve moves upward, the pressure of the contents within the canister, together with the spring 205 and ball 207, closes the one-way ball check valve 200 to prevent the back flow of the contents into the canister.

The canister connector 126 is secured through the bottom wall 252 and connects to a stem gasket 103 in the mounting cup 120 of the canister 118. In this embodiment, the stem gasket 103 includes threads for a connection with the canister connector 126. As shown in FIGS. 7A and 7B, the canister connector may be secured within the bottom wall 252 by an adhesive or press fit engagement, or secured within a sleeve component 254 engaged within the bottom wall.

As shown in FIGS. 6, 7*a*, 7*b*, 10*a* and 10*b*, the trigger valve shoulder 138 and lock shoulder 139 are each formed at a right angle at and near, respectively, the bottom of the actuation portion of each leg 133 of the trigger 104. Those skilled in the art recognize that the angles or curves built into the trigger may vary to correspond with associated components including the valve 200 and other components.

During operation, compression of the trigger 104 rotates the trigger about the pivot 105 to move the valve shoulder 138 on each leg 135 of the trigger 104 downward to engage and move/push the support pins 146 of the valve body portion 206 downward within the guide channels 136. The cross-sectional views of FIGS. 10*a*, 10*b* and 12 illustrate movement of the trigger 104 between operating position in FIG. 10*b*, and non-operating position in FIG. 10*a*. The trigger return spring 220 surrounds the axle 202, and is engaged for resistance on one end 221 with an internal surface of the finger operating portion or web 131 of the trigger, and on a second end 222 for resistance against the bottom wall 252.

In this embodiment, for example, the canister 118 may contain a refrigerant and the sensor may be a temperature and humidity sensor. Sensor 108 is shown with a clip 162, and shaped openings 172, S forming an airflow channel 164 through the sensor. On the opposite side from the clip 162 may be a vent 165, which allows the escape of air passing through the sensor 108. The two arms of the clip 162 are configured to snap over the projections 170 or a vane, vent or other component in an airflow path, such as a vent in a car dash.

The sensor 108 includes electronics, which include the temperature and humidity sensor, microchip or microprocessor and wireless communication chip or module. These structural components may be built into the same chip or combined on a board. The wireless communication chip may be any type of communication module, such as BLUETOOTH, WIFI, ZIGBEE or other communication component, and may include an incorporated antenna or connect to an antenna. The electronics also include a power source, such as a battery, which may be removable and replaceable in some embodiments. The sensor also includes a switch to turn the sensor on and off for operation for the sensor as part of a system for refrigerant charging or for interaction with the air freshening filter media.

The side walls 112 and 114 also include corresponding protrusions 170 extending inwardly from the dispenser external housing. When the sensor 108 is inserted, the clip 162 fits around the corresponding protrusions 170. The protrusions 170 support the clip 162 within the dispenser housing 102 and prevent inadvertent movement of the sensor 108.

FIG. 12 illustrates a partial cut-away view of the dispenser. In this view, the stop pin 141 is inserted into the stop pin opening 144, to prevent movement of the valve and inadvertent dispensing of gas or fluid from the dispenser. In the FIGS. 8-10*b* and 12 views, the sensor 108 is removed from the dispenser external housing 102, and show the protrusions 170 providing additional support to the clip 162 to prevent the clip from moving. The top stem connector 204 of the one-way ball check valve is attached to the output hose 107 at the crimped connector 160. In this embodiment, the one-way ball check valve stem connector includes an extended valve stem 209 to fit a female stem gasket 103 of a canister 118. The extended valve stem 209 extends through the canister connector 126 into the canister 118 to allow refrigerant to flow from the canister. Again, the valve 200 blocks the reverse flow of fluid to prevent refrigerant intended for the vehicle refrigerant system from being forced back into the canister 118. While a one-way ball check valve is shown in the present embodiment, where supply chain problems require use of an alternate valve, such as a two-way valve, then one of the valve paths may be blocked to make use of any available valve device. This view also shows where the support pins engage within the guide channels and limit the ability to rotate the actuator components within the dispenser housing 102 relative to the canister connector 126 and the canister 118.

When the user pulls or squeezes the trigger 104, the trigger rotates or pivots about the axle 202 to engage the actuator valve shoulder 138 with the valve support pins 146 and move or slide the valve 200 down to open the valve and engage the extended valve stem 209 into the canister 118 to release the contents of the canister 118. The contents of the canister 118 flow through the extended valve stem 209, the one-way ball check valve 200, the top stem connector 204, and out through the output hose 107 and coupler 109 or other output feature.

FIG. 13 shows an illustrative use of a refrigerant charging system 300 for an automobile 312. The user has a canister 302 containing a refrigerant to charge the automobile 312's air conditioning system. The canister 302 has a dispenser 304 with an output hose 306, which is connected to the vehicle or automobile refrigerant system. The dispenser 304 may be configured as the dispensers described herein, having an internal actuator within a housing. The refrigerant charging or dispenser system 300 includes a sensor 308 clipped into a vehicle air vent. Prior to use, the sensor 308 may be held in a sensor opening of the dispenser housing. The refrigerant charging system 300 also incorporates the user's mobile device 310.

In this embodiment, the sensor 308 detects humidity and temperature in the airflow from the vent of the automobile 312. The sensor 308 will take baseline ambient temperature and humidity readings to begin. The sensor 308 will continue to read the temperature and humidity and will communicate the readings via a wireless communication to the mobile device 310.

The mobile computer application on the mobile device 310 will process the humidity and temperature from the initial reading to determine when the change in temperature and humidity indicates that the air conditioning system is fully charged. At such time, the application may display instructions for the user to stop charging the system. In some embodiments, the application may display color-coded signals to indicate the stage of the charging process. For example, the application may begin green, then change to yellow as the temperature and humidity approach the charged state and red when the charged state is reached. Ensuring that the air conditioning system is not overcharged protects the system from potential damage.

To use the refrigerant charging system 300, the user may remove the sensor 308 from the sensor opening in the dispenser 304 and attach it to the air vent. For example, the sensor 308 may include a clip that snaps onto the automobile 312's vent. The user may also connect the hose 306 to the automobile 312's air conditioning system for recharging refrigerant. The user may also open a monitoring application in the mobile device 310. The mobile device 310 and the sensor 308 may pair to ensure real-time communication.

With the setup complete, the user or another person may start the automobile 312 and turn the air conditioning system on to a full or highest cold setting. The user may then begin charging the air conditioning system by squeezing the trigger on the dispenser 304 when instructed by the system. The user may hold the trigger down while watching the application running on the mobile device 310. When the application indicates the air conditioning system is fully charged, the user releases the trigger of the dispenser 304 to stop charging the system. The application may provide a visual, auditory or sensory indication through the display, speakers or vibratory output of the mobile device 310.

The dispenser being thus described and further described in the claims, it will be obvious that the same may be varied in many ways. Such variations are not to be regarded as a departure from the spirit and scope set forth herein, and all such modifications as would be obvious to one skilled in the art are intended to be included within the scope of the apparatus described.

The invention claimed is:

1. A dispenser system for a canister, comprising:

a dispenser housing having an output opening for an output hose, a control opening, valve supports and a bottom housing, an actuator is provided within the dispenser housing that controls flow of contents from the canister, the actuator comprising:

an actuator trigger having a finger operating web portion interconnecting spaced legs, each leg having a pivot positioned within a boss that extends below the control opening within the dispenser housing for supporting the actuator trigger on an axle, and each leg having an activation portion including a valve shoulder;

a movable one way valve having a top stem connector attached to the output hose, a body portion with external support pins for sliding engagement within the valve supports, a stem connector with an extended valve stem operably connected to an output of the canister, a canister connector that fits into the bottom housing and attaches to a valve gasket of the canister, and a trigger return spring with one end engaged with the finger operating web portion, another end engaged with the bottom housing, and an intermediate spring coil adjacent the axle to bias the actuator trigger between a non-operating position wherein the contents do not flow out of the canister, and an operating position, wherein compression of the actuator trigger pivots the actuator to move the valve shoulder to depress the external support pins and move the movable valve to engage the output of the canister and cause the contents to flow out of the canister via the output hose.

2. The dispenser system for the canister of claim 1, wherein the stem connector includes a port configured to engage a valve stem that extends from the canister, wherein the valve stem is the output of the canister.

3. The dispenser system for the canister of claim 1, wherein the actuator trigger activation portion includes a lock shoulder above the valve shoulder.

4. The dispenser system for the canister of claim 3, having a removable lock pin to prevent operation of the dispenser actuator trigger when the removable lock pin is engaged with the lock shoulder in locked position through the dispenser housing.

5. The dispenser system for the canister of claim 4, wherein the activation portions of the legs of the actuator trigger are spaced a distance apart for surrounding the body portion of the valve, and for the valve shoulder to engage the support pins extending from the valve to move the valve down upon compression of the trigger to cause the contents to flow out of the canister.

6. The dispenser system for the canister of claim 2, having elongate guide channels extending inwardly from side walls of the dispenser housing for capturing the support pins for sliding movement of the valve during operation of the dispenser system.

7. The dispenser system for the canister of claim 6, having axle mounts extending inwardly from side walls of the dispenser housing for supporting the axle.

8. The dispenser system for the canister of claim 1, having a sensor opening in the dispenser housing that holds a sensor.

9. The dispenser system for the canister of claim 2, wherein the sensor is removable.

10. The dispenser system for the canister of claim 3, wherein the sensor includes a wireless communication chip, and the dispenser system includes a mobile device that receives sensor data from the wireless communication chip, wherein the mobile device provides operation instructions for dispensing the contents from the canister based on the sensor data.

11. The dispenser system of claim 9, having an air freshening air permeable filter media within the sensor for removing contaminants and/or particulates through the sensor.

12. The dispenser system of claim 11, the air freshening air permeable filter media having a scented air freshening material for dispersing a scent through the sensor.

13. An actuator control for a canister dispenser system, comprising:

an actuator trigger having a finger operating web portion interconnecting spaced legs, each leg having a pivot positioned within a boss that extends below the finger operating web portion for supporting the actuator trigger on an axle, and each leg having an activation portion including a valve shoulder;

a valve having a top stem connector attached to an output hose, a body portion with external support pins, a stem connector with an extended valve stem operably connected to an output of the canister, a canister connector that fits into the bottom housing and attaches to a valve gasket of the canister, and a trigger return spring with a spring coil surrounding the axle to bias the actuator trigger between a non-operating position wherein the contents do not flow out of the canister, and an operating position, wherein compression of the actuator trigger pivots the actuator control to move the valve shoulder to depress the external support pins and move the valve to engage the output of the canister and cause the contents to flow out of the canister via the output hose.

14. The actuator control for the canister dispenser system of claim 13, wherein the stem connector includes a port configured to engage a valve stem that extends from the canister, wherein the valve stem is the output of the canister.

15. The actuator control for the canister dispenser system of claim 13, wherein the actuator trigger activation portion includes a lock shoulder above the valve shoulder.

16. The actuator control for the canister dispenser system of claim 15, having a lock pin to prevent operation of the actuator trigger when the lock pin is engaged with the lock shoulder in locked position.

17. The actuator control for the canister dispenser system of claim 16, wherein activation portions of the legs of the actuator trigger are spaced a distance apart for surrounding the body portion of the valve, and for the valve shoulder to engage the support pins extending from the valve to move the valve down upon compression of the actuator trigger to cause the contents to flow out of the canister dispenser system.

18. The actuator control for the canister dispenser system of claim 17, wherein the distance the activation portions of the legs of the actuator trigger are spaced apart is larger than portions of the legs having the pivot positioned within the boss extending below the finger operating web portion.

19. A method for dispensing contents from a pressurized canister for recharging a vehicle air conditioning system using a dispenser system comprising the steps of:

removing a removable sensor from a sensor opening in a dispenser housing that holds the removable sensor and attaching it to a vehicle air vent;

attaching a quick disconnect coupler on an output hose of the dispenser system to the vehicle air conditioning system;

removing a removable lock pin from a locked position engaged with a lock shoulder within the dispenser housing to permit operation of an actuator control;

actuating an actuator trigger of the actuator control by compressing an actuator trigger on a finger operating portion extending through a control opening through the dispenser housing, and pivoting the actuator trigger about a pivot positioned within a boss within the dispenser housing below the control opening supported on an axle engaged with the dispenser housing, engaging the actuator trigger on a valve shoulder with a movable valve having a top stem connector attached to the output hose, a body portion with external support pins for sliding engagement within valve supports within the dispenser housing, and a stem connector with an extended valve stem operably connected to an output of the canister, and biasing a trigger return spring to move the actuator trigger into the dispenser housing and an operating position, moving the valve shoulder and depressing the external support pins on the movable valve;

causing the contents of the canister to flow out of the canister via the output hose and quick disconnect coupler to recharge the vehicle air conditioning system; and receiving instruction from the removable sensor to cease actuation of the actuator trigger and stop the contents of the canister from flowing out of the canister.

* * * * *